(12) United States Patent
Manuel

(10) Patent No.: US 7,021,523 B2
(45) Date of Patent: Apr. 4, 2006

(54) TOOL AND A METHOD FOR CREATING A TOOL

(76) Inventor: Mark Manuel, 14377 Knightsbridge, Shelby Township, MI (US) 48315

( * ) Notice: Subject to any disclaimer, the term of this patent is extended or adjusted under 35 U.S.C. 154(b) by 75 days.

(21) Appl. No.: 11/017,341

(22) Filed: Dec. 20, 2004

(65) Prior Publication Data

US 2005/0103427 A1 May 19, 2005

Related U.S. Application Data

(63) Continuation of application No. 10/000,910, filed on Nov. 1, 2001, now abandoned.

(51) Int. Cl.
*B23K 31/02* (2006.01)
(52) U.S. Cl. ............................. 228/245; 228/258
(58) Field of Classification Search ............ 228/245, 228/258, 256, 248.1; 30/342, 345, 350; 428/77, 428/78, 609, 615, 650, 660; 76/119; 407/119
See application file for complete search history.

(56) References Cited

U.S. PATENT DOCUMENTS

| | | | |
|---|---|---|---|
| 1,539,887 A | | 6/1925 | Vandergrift |
| 2,053,977 A | * | 9/1936 | Taylor ..................... 407/118 |
| 3,206,834 A | * | 9/1965 | Hendrick .................. 228/155 |
| 3,256,599 A | * | 6/1966 | Vordahl .................... 228/190 |
| 3,416,766 A | | 12/1968 | Miller |
| 4,141,531 A | | 2/1979 | Stausfeld |
| 4,474,722 A | | 10/1984 | Martin |
| 4,758,385 A | * | 7/1988 | Acker et al. ................ 261/153 |
| 4,810,591 A | | 3/1989 | Sakai |
| 4,867,412 A | | 9/1989 | Greune |
| 4,946,552 A | | 8/1990 | Onnie |
| 4,997,602 A | | 3/1991 | Trimble |
| 5,032,469 A | | 7/1991 | Merz |
| 5,079,102 A | | 1/1992 | Tanaka |
| 5,106,290 A | | 4/1992 | Carver et al. |
| 5,151,167 A | | 9/1992 | Truong |
| 5,156,322 A | | 10/1992 | Thoi |
| 5,256,496 A | | 10/1993 | Kluczynski |

(Continued)

FOREIGN PATENT DOCUMENTS

EP   0 775 550 A1   5/1997

(Continued)

OTHER PUBLICATIONS

Walczyk, Rapid tooling for sheet metal forming using profiled edge laminations—Design principles and demostration Transactions of the ASME, Nov. 1998, vol. 120, pp. 746-754, USA.

(Continued)

*Primary Examiner*—Jonathan Johnson
(74) *Attorney, Agent, or Firm*—Law Offices of John Chupa & Associates, P.C.

(57) ABSTRACT

A method for forming a tool 10 and a tool 10 which is comprised of several selectively coupled sectional members, such as members 12, 16, which are placed upon a heat resistant surface 20. A sealing material 24, such as copper in a solid molecular state, is placed around the periphery of the tool 10. The copper in a solid molecular state 24, the heat resistant surface 20, and the tool 10 are placed within a heat source which transforms the copper in a solid molecular state 24 into liquid which flows within the gaps, such as gap 41 and within knife edges 26, 28 which exists within the tool 10. After the copper 24 cools, the cooper 24 reinforces and strengthens the tool 10.

6 Claims, 2 Drawing Sheets

U.S. PATENT DOCUMENTS

| | | |
|---|---|---|
| 5,273,803 A | 12/1993 | Metcalf |
| 5,330,343 A | 7/1994 | Berteau |
| 5,345,052 A | 9/1994 | Puddephatt |
| 5,377,116 A | 12/1994 | Wayne et al. |
| 5,399,239 A | 3/1995 | Pai |
| 5,400,946 A | 3/1995 | Weise |
| 5,421,544 A | 6/1995 | Roop |
| 5,439,622 A | 8/1995 | Pennisi et al. |
| 5,462,263 A | 10/1995 | Feltrin |
| 5,529,805 A | 6/1996 | Iacovangelo |
| 5,641,448 A | 6/1997 | Yeung |
| 5,792,492 A | 8/1998 | Takahashi |
| 5,948,548 A | 9/1999 | Welty |
| 6,024,851 A | 2/2000 | Radhakrishnan |
| 6,025,036 A | 2/2000 | McGill |
| 6,038,525 A | 3/2000 | Maguire |
| 6,060,392 A | 5/2000 | Essaian |
| 6,063,436 A | 5/2000 | Pavell |
| 6,081,328 A | 6/2000 | Eng |
| 6,090,207 A | 7/2000 | Knauss |
| 6,090,507 A | 7/2000 | Grenon |
| 6,103,402 A | 8/2000 | Marcin, Jr. |
| 6,109,332 A | 8/2000 | Sachs |
| 6,113,752 A | 9/2000 | Hollstein |
| H1933 H | 1/2001 | Zabinski |
| 6,207,294 B1* | 3/2001 | Rutter ........................ 428/609 |
| 6,391,473 B1 | 5/2002 | Numakura |
| 6,472,029 B1 | 10/2002 | Skszek |
| 6,495,272 B1 | 12/2002 | Creber |
| 6,627,835 B1 | 9/2003 | Chung |
| 6,793,990 B1* | 9/2004 | Sakaguchi et al. ............ 428/34 |
| 2002/0175265 A1 | 11/2002 | Bak |
| 2004/0091627 A1* | 5/2004 | Ohara et al. ................. 427/402 |
| 2004/0128016 A1 | 7/2004 | Stewart |

FOREIGN PATENT DOCUMENTS

| | | |
|---|---|---|
| EP | 1216 806 A2 | 6/2002 |
| WO | WO 88/07932 | 10/1988 |
| WO | WO 01/70450 A1 | 9/2001 |
| WO | WO 03/043795 | 5/2003 |

OTHER PUBLICATIONS

Alink, EPO Office Action for Application # 01130484.7-2307, Aug. 18, 2004.

A New Rapid Tooling Method For Sheet Metal Forming Dies Inventor :Daniel Walczyk, no date avail.

* cited by examiner

TOOL AND A METHOD FOR CREATING A TOOL

This application is a continuation of 10/000,910, filed Nov. 1, 2001, now abandoned.

FIELD OF THE INVENTION

The present invention generally relates to a tool and to a method for creating a tool and more particularly, to a laminated tool which is formed by the creation and the selective coupling of members which have certain respective attributes and which are rigidly and selectively sealed in an efficient manner, thereby allowing for the creation of a relatively strong tool.

BACKGROUND OF THE INVENTION

A production or a prototype tool, such as a mold, die, or other object formation apparatus is used to repeatedly form or create substantially similar objects or products. Conventional tooling methodologies and strategies (e.g., stamping, molding, and casting) typically require a solid block of material (e.g., a wrought block of solid steel) to be machined, burned, or otherwise "worked" into a desired shape or form, thereby forming or creating a tool having a desired shape and geometrical configuration. While these strategies and methodologies do produce tools having a desired shape or form, these strategies and methodologies are relatively expensive and inefficient and/or time consuming.

Alternatively, the tool may be formed by a laminar process in which various sectional members or laminates are created and selectively coupled (e.g., by gluing, bolting, welding, or bonding), effective to allow the coupled members or laminates to cooperatively form the tool (i.e., as the separate and respective laminates are formed, they are stacked and coupled to collectively form the desired tool). Particularly, the laminar process of forming a tool is a relatively cost effective, efficient, and simple method for producing production and/or prototype tools.

However, tools which are formed by a laminar process are oftentimes structurally weaker or suffer from an overall weaker constitution than those formed by the conventional process of machining due to a failure to adequately or fully and rigidly secure the sections or laminates together. Any movement in the sections will undesirably cause the surface of tool to change, thereby causing the production of inferior and "out of tolerance" components. Moreover, a further drawback associated with laminated tooling is the difficulty in developing or creating a smooth continuous angled surface formed by adjacently coupled laminates or sectional plates. That is, "knife edges" typically exist between adjacent sections or laminates which cooperately form a greatly varying surface contour. A "knife edge" is an edge or axis which is disposed within a greatly varying surface formed by a pair of adjacently coupled laminates. By way of example and without limitation, these "knife edges" undesirably disturb the relatively smooth transition between adjacently coupled plates or laminates, thereby causing a poor and undesirable surface finish. Moreover, these "knife edges" are very thin and relatively fragile and are likely to prematurely fail and become easily damaged during machining and finishing. Moreover, when a tool having "knife edges" is used in injection molds, the injected material tends to peel the laminate in the vicinity of the knife edges, thereby significantly lowering the usable life of the tool. Moreover, such "knife edges" make the tolerances associated with and required of the production parts very difficult to maintain. Hence, it should be realized that each of the aforementioned problems or drawbacks results in a substantially ineffective tool, higher production costs, and inefficient overall operation.

There is therefore a need for a method to selectively create a laminated tool which overcomes some or all of the previously delineated drawbacks of prior techniques and strategies. Moreover, there is a further need to form a laminated tool, by the use of a method which allows for "knife edges" to be seamlessly "blended" or eliminated in a relatively fast, inexpensive, and efficient manner. There is also a need to form a relatively strong tool which overcomes some or all of the previous delineated disadvantages of pror tools formed by a laminar process. These and other needs are addressed by the present invention, as is more fully delineated below.

SUMMARY OF THE INVENTION

It is a first non-limiting advantage of the present invention to provide a method for creating a laminated tool which overcomes some or all of the previously delineated drawbacks of prior techniques.

It is a second non-limiting advantage of the present invention to provide a tool which is relatively strong.

It is a third non-limiting advantage of the present invention to provide a method for creating a laminated tool which overcomes some or all of the previously delineated drawbacks associated with prior laminating tooling methodologies and which, by way of example and without limitation, allows for the efficient formation of a relatively smooth surface which is cooperatively formed by a pair of adjacently coupled laminates.

According to a first aspect of the present invention, a tool is provided. Particularly, the tool comprises at least a first and a second section, the at least second section being attached to the at least first section; and a sealer material disposed between the at least first and second sections.

According to a second aspect of the present invention a laminated tool is provided. Particularly, the laminated tool is made by the process of creating a first member of a certain shape; creating a second member of a certain shape; registering the first member with the second member; attaching the second member to the first member; providing a certain material; placing the certain material in close proximity to the first and second members; and heating the first and second member and the certain material, effective to cause the certain material to flow between the first and second members.

According to a third aspect of the present invention, a method is provided for creating a tool. The method includes the steps of forming a first member having a certain shape; forming a second member having a certain shape; attaching the first member to the second member; placing the attached first and second members on a surface; disposing a certain material around the periphery of the attached first and second members; heating the surface, the attached first and second members, and the certain material for a predetermined amount of time; and removing the attached first and second members from the heat source.

These and other features, aspects, and advantages of the present invention will become apparent to those of ordinary skill in the art from a reading of the following detailed description of the preferred embodiment of the invention and by reference to the following drawings.

DETAILED DESCRIPTION OF THE PREFERRED EMBODIMENT OF THE INVENTION

Figure 1:
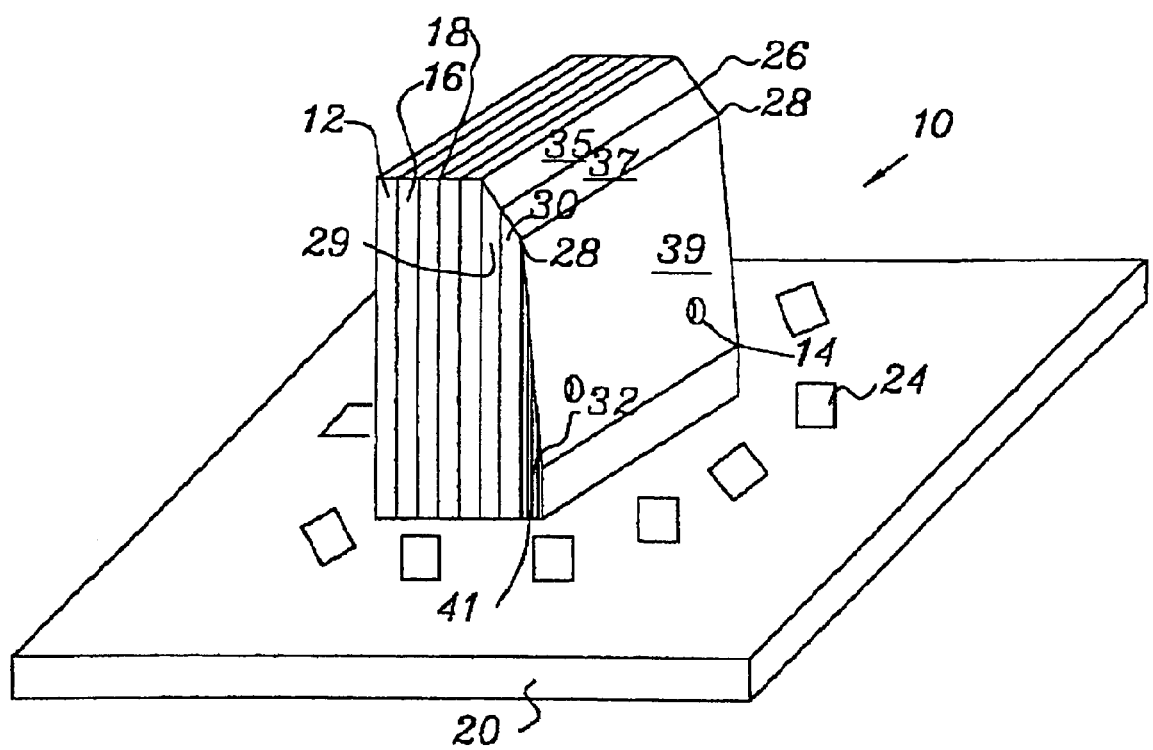
FIG. 1 is a perspective view of a tool which is made in accordance with the teachings of the preferred embodiment of the invention in combination with a heat resistant surface and sealer material.
Figure 2:
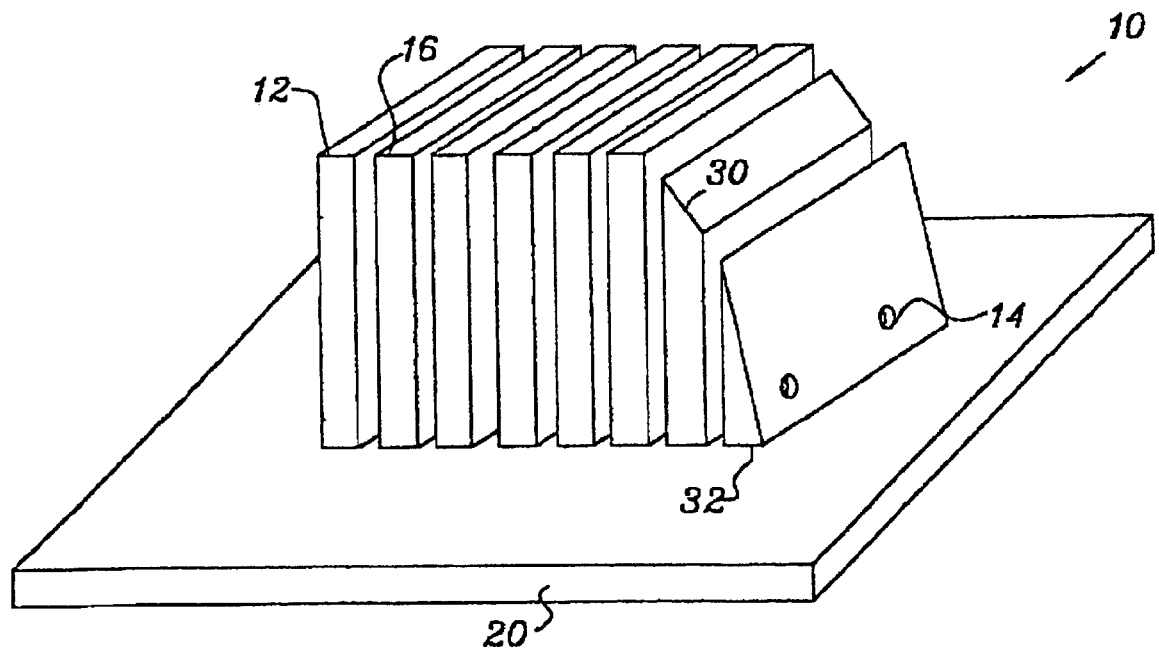
FIG. 2 is a perspective unassembled view of the tool which is shown in FIG. 1.

Referring now to FIGS. 1 and 2, there is shown a tool 10 which is made in accordance with the teachings of the preferred embodiment of the invention. It should be realized that tool 10 may be of any substantially desired shape or geometric configuration and that nothing in this Application is intended to limit the applicability of the invention to a particular type of tool or apparatus. Rather, the tool 10 is only one non-limiting example of a tool which may be produced according to the invention.

Figure 3:
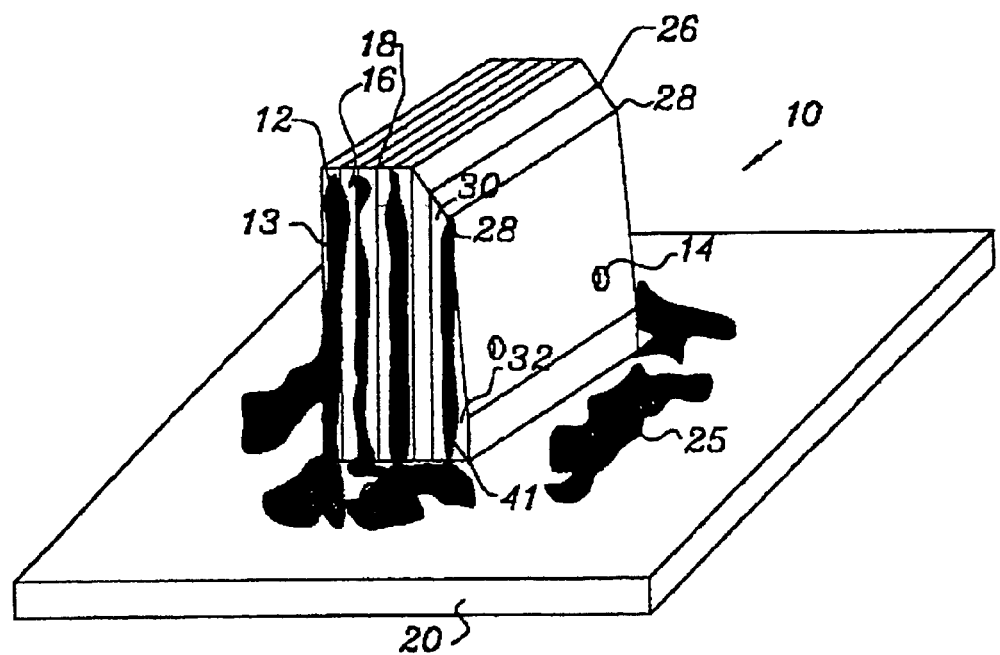
FIG. 3 is a view which is similar to that which is shown in FIG. 1 but illustrating the flow of the sealer material into gaps which reside within the tool.

Particularly, tool 10 is made by the use of a lamination process in which several sectional members, such as sectional members 12, 16 are selectively formed and then selectively coupled or connected in a predetermined manner in order to cooperatively form the tool 10. It should be appreciated that nothing in this Application is meant to limit the applicability of the invention to a particular type, shape, or configuration of sectional members. Moreover, the sectional members which are shown in FIGS. 1–3, such as sectional members 12, 16, are used for illustrative purposes only and are not meant to limit the scope of the invention in any manner.

Particularly, as will be noted from the discussion below and according to the preferred embodiment of the invention, some of seams, such as seam 18, which are formed between adjacent and bonded sectional members, such as members 12, 16, reside within a generally flat surface portion of the tool 10 and generally do not pose the same difficulties which are associated with knife edges. The term "adjacent", in this description, means the sectional members are physically and abuttingly connected within or as part of the tool 10.

Particularly, the sectional members, such as sectional members 12, 16, are connected (e.g., by conventional lamination techniques), thereby forming the seams 18. Hence, a seam 18 is formed by the registration (e.g., the at least partial "alignment") of a first one of the sections with a second one of the sections. These utilized sections may be of any desired and respective shape, size, and/or geometric configuration. Moreover, abutting sections may have a respective and unique or different shape.

Furthermore, the laminated tool 10 also includes "knife edges" or "knife type seams" 26, 28 which are respectively formed between the sectional pairs 29, 30; and 30, 32 and are substantially and structurally weaker than the seam 18 (e.g., prone to failure and having the drawbacks which have been discussed above). Particularly, edge 26 is created between the angled portion 35 of section 29 and the angled portion 37 of section 30, thereby forming seam 26 which resides within a greatly varying surface contour region of the tool 10. Knife edge 28 is formed between the angle portion 37 of section 30 and the substantially flat face 39 of section 32. Gaps typically exist within each of the seams 18, 26, 28.

It should be understood that nothing in this Application is meant to limit the angles of the tool 10 to a certain angle or to the number of "knife edges" 26, 28 which are formed by the lamination process which is used to create the tool 10. Rather, the location of seams 18 and "knife edges" 26, 28 are for illustrative purposes only and are not meant to limit the invention in any manner. Cooling holes 14 may be formed within the tool 10 after the tool has been constructed in a conventional manner (e.g., by machining) or these holes 14 may be formed from the registration of holes which respectively occur within some or all of the sections which are used to create the tool 10. Moreover, gaps, such as gap 41, may reside within or be disposed within the formed tool 10 (e.g., between sections 30, 32) even after the sections, such as sections 30, 32 are attached by a conventional lamination strategy. These gaps may be created/formed by imperfections occurring upon the surface of certain sections, such as bumps, or by a misalignment or misregistration of two adjacent sections. Such gaps are also typically present along knife edges, such as edges 26, 28 and within the seams 18. As earlier delineated, these gaps undesirably weaken the tool 10 and may cause sections, forming the gap, to undesirably shift.

As best shown in FIG. 1, according to the methodology of the invention, the laminated tool 10 is subject to the methodology of the preferred embodiment of the invention and, as such, the tool 10, according to the teachings of the present invention, represents or comprises a "pre-tool" apparatus (e.g., an apparatus which must be subjected to further processing in order to form a final tool having desired characteristics or attributes). Particularly apparatus or pre-tool 10 is disposed upon a heat resistant surface 20 and discrete portions of sealable material, such as copper 24 residing within or formed within a substantially solid molecular state are selectively placed upon the heat resistant surface 20 and generally around the periphery of the laminated tool 10. Hence, the laminated tool 10 is placed upon a heat resistant surface 20 and a predetermined total volume of the copper 24 is placed upon the heat resistant surface 20 in selected positions around the base periphery 34 of the tool 10. It should be understood that nothing in this description is meant to limit the type of material which is placed around the periphery of the tool 10. For example and without limitation, the copper material may be replaced with bronze or any other desired and selectively "meltable" and "flowable" material. It should be further understood that the form or the shape of the selected bronze or copper is not limited to a square sheet but can be utilized in a powder form, block form, and coil form, and that nothing in this description is meant to limit the invention to a particular form of copper. In the preferred embodiment of the invention, the total volume of copper which is disposed around the periphery of the pre-tool 10 is equal to the sum of each volume of each gap present within the pre-tool 10 and, in an alternative embodiment of the invention, is equal to about one half of the total volume of the pre-tool 10. Other calculatable amounts of the sealing and reinforcement material 24 may be utilized.

As best shown in FIG. 3, after the calculated amount of the copper in solid molecular state 24 is disposed on the heat resistant surface 20 and around the base of the laminated tool 10, the heat resistant surface 20, the laminated tool 10, and the copper 24 are heated or placed in a heat source (not shown). For example and without limitation, the heat source may comprise a furnace, an oven, or substantially any other commercially available and conventional heat source.

The heat source temperature is then raised to a temperature which is above the melting point of the copper 24 (i.e., the temperature at which copper transforms from a solid molecular state to a liquid molecular state, or approximately 1000 degrees Celsius), and the laminated tool 10 is contained or "baked" within the heat source for approximately one-half of an hour (the "baking" time varies depending on the size of the laminated tool). During this "baking" time, the copper in solid molecular state 24 melts into a liquid state or form and naturally flows or "wicks" between all of the coupled laminates and within all of the gaps formed within the pre-tool 10 (i.e., the melted copper 25 naturally flows into the gaps, such as gap 41, which exist within the laminated pre-tool, around the laminated pre-tool 10, within the seams 18, and within the "knife edges" 26, 28) at this temperature (i.e., 1000 degrees Celsius). Hence, the copper flows within and seals the gaps which may exist within the laminated pre-tool 10 and reinforces or strengthens the pre-tool 10 such as in the vicinity of the knife edges 26, 28 after the copper sealingly and reinforceably cools, thereby forming a "final" tool 10 having desired structural properties and attributes.

It should be appreciated that the shear strength of the laminated tool 10 using the process delineated above, is approximately ninety percent that of a wrought block of equivalent steel (i.e., the traditional material used in the machining process). It should also be appreciated that the invention is not limited to the exact construction and method which has been described above, but that various alterations and modifications may be made without departing from the spirit and the scope of the invention as is delineated in the following claims and that the cooper material 24 functions as a sealant to strengthen the previously coupled sectional members, thereby allowing a relatively strong tool 10 to be constructed. It should also be appreciated that the copper 24 may be applied to adjacent pairs of sectional members, such as member 12, 16 shortly after the members 12, 16 are attached and that the entire tool or pre-tool 10 need not be subjected to the foregoing process.

What is claimed is:

1. A method for creating a tool having at least one knife edge comprising the steps of:
   forming a first member having a certain shape;
   forming a second member having a certain shape;
   attaching said first member to said second member;
   placing said attached first and second members on a surface;
   disposing a certain material around the periphery of said attached first and second members;
   placing said surface, said attached first and second members, and said certain material in a heat source which provides a certain temperature for a predetermined amount of time; causing said certain material to wick between said first and second member, and
   removing said attached first and second members from said heat source, effective to form a relatively strong laminated tool.

2. The method of claim 1, wherein said step of placing said attached first and second members on a surface further comprises the step of providing a surface which is heat resistant.

3. The method of claim 1, wherein said step of disposing a certain material around the periphery of said attached first and second members further comprises the step of providing a certain material which comprises a molecular structure which allows said certain material to have a lower melting point than the material of said first and said second members.

4. The method of claim 3, wherein said step of disposing a certain material around the periphery of said attached first and second members further comprises the step of calculating the amount of said certain material needed by summing the volume of gaps occurring within the tool.

5. The method of claim 1, wherein said step of placing said surface, said attached first and second members, and said certain material in a heat source which provides a certain temperature for a predetermined amount of time further comprises the step of providing a heat source which is capable of generating a sufficient level of heat to transform said certain material from a solid molecular state to a liquid molecular state.

6. The method of claim 1, wherein said step of removing said attached first and second members from said heat source further comprises the step of allowing said first and second attached members to cool before utilizing said laminated tool.

* * * * *